United States Patent
Croak et al.

(10) Patent No.: US 8,588,083 B1
(45) Date of Patent: Nov. 19, 2013

(54) METHOD AND APPARATUS FOR MEASURING VOICE QUALITY IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1443 days.

(21) Appl. No.: 11/323,287

(22) Filed: Dec. 29, 2005

(51) Int. Cl.
- H04L 12/26 (2006.01)
- H04L 12/42 (2006.01)
- H04L 12/66 (2006.01)
- G06F 13/00 (2006.01)
- H04M 3/00 (2006.01)

(52) U.S. Cl.
USPC ........... 370/252; 370/352; 370/231; 370/232; 370/253; 379/112.01; 709/223; 709/224

(58) Field of Classification Search
USPC ................. 370/229–236, 252–253, 352–356; 379/1.01–35, 112.01–112.06; 714/35–57; 375/224–225; 709/223–224
See application file for complete search history.

(56) References Cited

U.S. PATENT DOCUMENTS

| | | | |
|---|---|---|---|
| 5,687,223 A * | 11/1997 | Elliott et al. | 379/112.09 |
| 6,002,753 A * | 12/1999 | Morrison et al. | 379/112.01 |
| 6,628,765 B1 * | 9/2003 | Bangs et al. | 379/112.01 |
| 7,046,636 B1 * | 5/2006 | Shaffer et al. | 370/252 |
| 7,197,010 B1 * | 3/2007 | Berstein et al. | 370/252 |
| 7,336,613 B2 * | 2/2008 | Lloyd et al. | 370/237 |
| 7,382,735 B2 * | 6/2008 | Chong | 370/252 |
| 2001/0041566 A1 * | 11/2001 | Xanthos et al. | 455/423 |
| 2002/0076030 A1 * | 6/2002 | Statham et al. | 379/229 |
| 2003/0227870 A1 * | 12/2003 | Wagner et al. | 370/229 |
| 2004/0052353 A1 * | 3/2004 | Sherratt et al. | 379/265.03 |
| 2005/0094799 A1 * | 5/2005 | Elsey | 379/266.04 |
| 2005/0287954 A1 * | 12/2005 | Lim et al. | 455/67.11 |
| 2006/0015366 A1 * | 1/2006 | Shuster | 705/1 |
| 2006/0034187 A1 * | 2/2006 | Pack | 370/252 |
| 2006/0187851 A1 * | 8/2006 | Waldorf et al. | 370/252 |
| 2006/0280313 A1 * | 12/2006 | Schmidmer et al. | 381/56 |
| 2007/0121596 A1 * | 5/2007 | Kurapati et al. | 370/356 |

* cited by examiner

*Primary Examiner* — Asad Nawaz
*Assistant Examiner* — Wutchung Chu

(57) ABSTRACT

Method and apparatus for measuring voice quality in a packet network is described. In one example, statistics for calls in the packet network per customer segment of a plurality of customer segments are obtained over a period of time. The statistics are processed to identify call patterns for the plurality of customer segments. Sample measurements of voice quality are obtained for each of the plurality of customer segments in response to the call patterns.

6 Claims, 4 Drawing Sheets

200

METHOD AND APPARATUS FOR MEASURING VOICE QUALITY IN A PACKET NETWORK

BACKGROUND OF THE INVENTION

1. Field of the Invention

Embodiments of the present invention generally relate to telecommunications systems and, more particularly, to a method and apparatus for measuring voice quality in a packet network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

Calls in a VoIP network typically follow a pattern with respect to time of day, day of week, and geographical distributions. For example, most consumer traffic may be local to the subscriber base and occur during the evenings and weekends. The voice quality experienced by particular customer segments may vary as a function of these traffic patterns. Accordingly, there exists a need in the art for a method and apparatus for measuring voice quality in a packet network capable of accounting for particular traffic patterns across customer segments.

SUMMARY OF THE INVENTION

Method and apparatus for measuring voice quality in a packet network is described. In one embodiment, statistics for calls in the packet network per customer segment of a plurality of customer segments are obtained over a period of time. The statistics are processed to identify call patterns for the plurality of customer segments. Sample measurements of voice quality are obtained for each of the plurality of customer segments in response to the call patterns.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
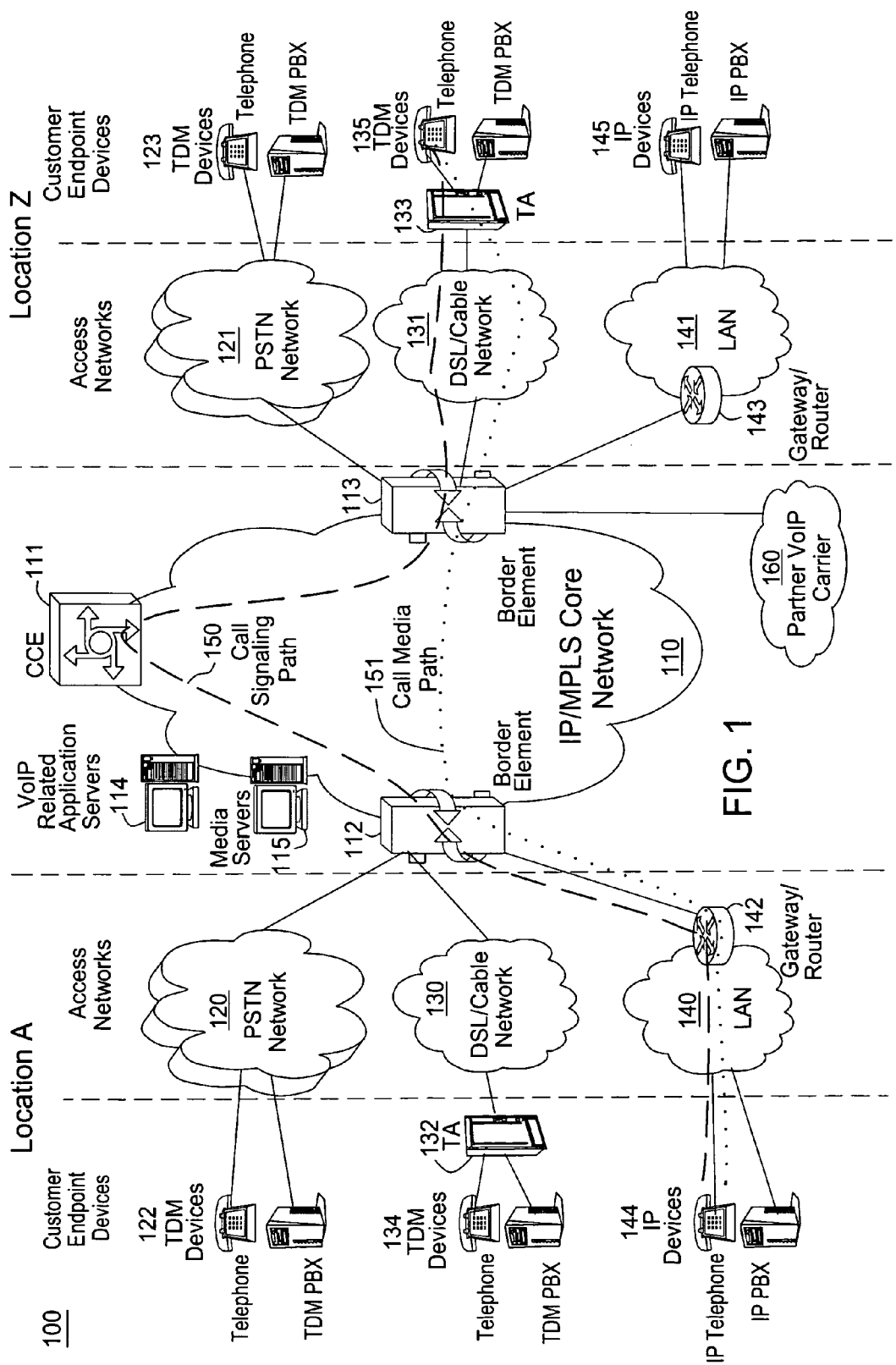
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
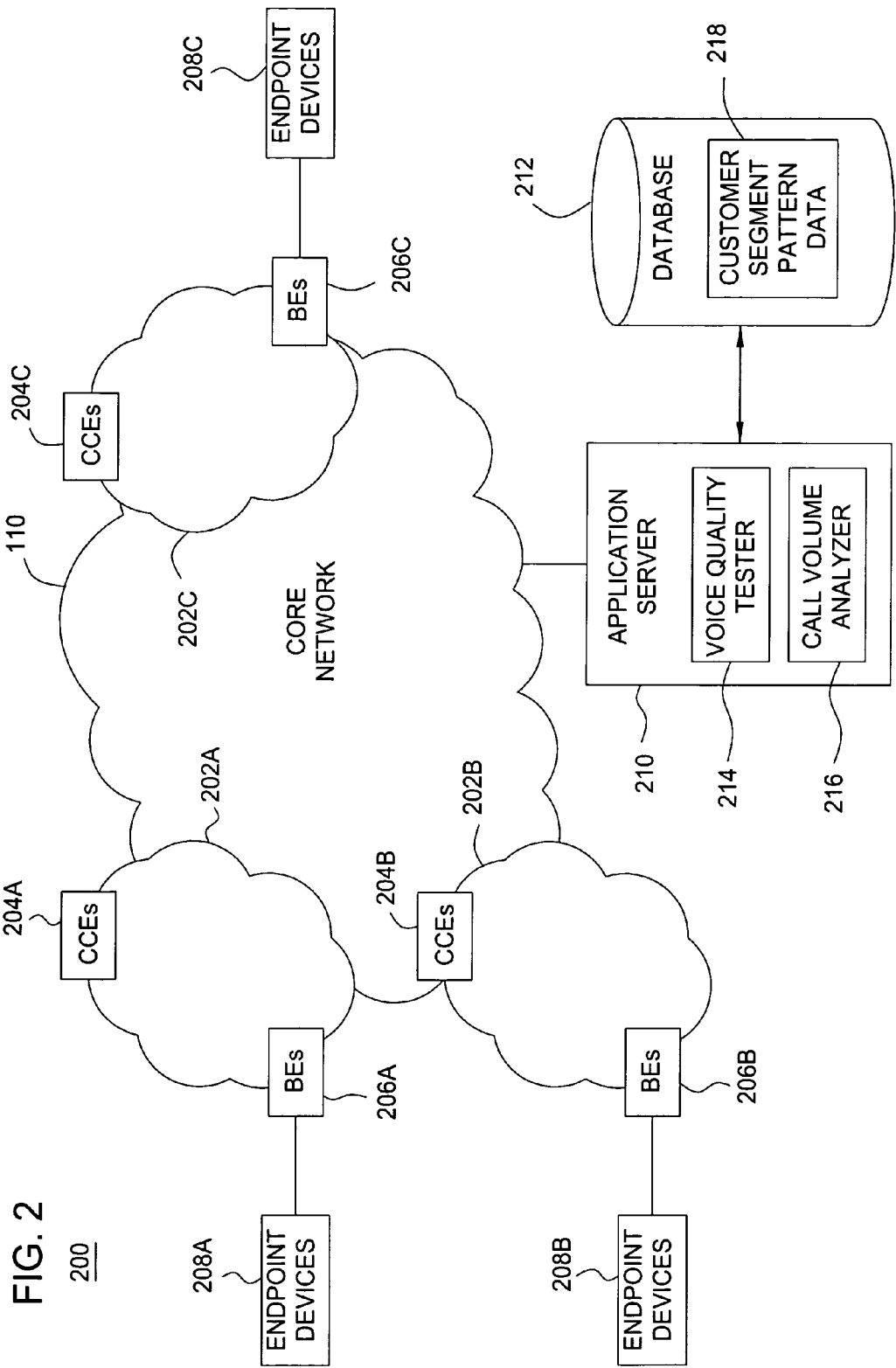
FIG. 2 is a block diagram depicting an exemplary embodiment of a portion of the communication system of FIG. 1 in accordance with one or more aspects of the invention.

FIG. 2 is a block diagram depicting an exemplary embodiment of a portion 200 of the communication system 100 of FIG. 1 in accordance with one or more aspects of the invention. In the portion 200, the core network 110 illustratively includes network portions 202A, 202B, and 202C (collectively network portions 202). The network portions 202 correspond to different geographical regions serviced by the core network 110. The network portion 202A illustratively includes CCEs 204A and BEs 206A. The network portion 202B illustratively includes CCEs 204B and BEs 206B. The network portion 202C illustratively includes CCEs 204C and BEs 206C. Endpoint devices 208A are coupled to the BEs 206A. Endpoint devices 208B are coupled to the BEs 206B. Endpoint devices 208C are coupled to the BEs 206C.

An application server 210 coupled to the core network 110 is configured to implement a voice quality tester 214 and a call volume analyzer 216. The call volume analyzer 216 is configured to obtain statistics for calls in the core network 110 per customer segment of multiple customer segments. Exemplary customer segments include a consumer segment, a wholesaler segment, an enterprise segment, and the like. The consumer segment includes individual customers of core network provider. The wholesaler segment includes customers of the core network provider that re-brand the services and provide the re-branded services to their own customer base. The enterprise segment includes corporate customers or small business customers of the core network provider. The call volume analyzer 216 is configured to distinguish among calls made by the different customer segments and obtain statistics for each of the customer segments.

The statistics obtained by the call volume analyzer 216 may include call volumes in the packet network for each of the customer segments over a period of time. Call volume is the number of concurrent calls for a given customer segment established in the network at a particular time. The statistics may include geographical distributions of calls for each of the customer segments. A geographical distribution of calls may include a number of calls that originate and terminate within each of the network portions (i.e., intra-region calls). The geographical distribution of calls may include a number of calls that originate in one network portion and terminate in another network portion (i.e., inter-region calls). The statistics may include a combination of call volumes and geographical distributions for each of the customer segments.

The call volume analyzer 216 is configured to process the statistics to identify a call pattern for each of the customer segments. For example, for a given customer segment, a call pattern is based on the call volume over a period of time and the geographical distribution of calls during that time. For example, a pattern for a consumer segment may indicate that most of the calls are intra-region calls and occur during evenings and weekends, whereas fewer calls are inter-region and fewer calls occur during the data on weekdays. A pattern for an enterprise segment may indicate that a majority of the calls are inter-region calls and occur during business hours (e.g., during the day on weekdays). In general, a call pattern for each customer segment correlates call volume, time (e.g., time of day, day of week, etc.), and geographical call distribution. The call patterns for the customer segments are stored in a database 212 as customer segment pattern data 218. The call volume analyzer 216 is configured to periodically update the customer segment pattern data 218.

The voice quality tester 214 is configured to obtain sample measurements of voice quality for each of the customer segments using the customer segment pattern data 218. The voice quality tester 214 is configured to establish testing rules based on the customer segment pattern data. For example, a rule may dictate that voice quality be measured within a portion or portions of network 110 corresponding the geographical distribution of calls for a given customer segment, and at times when call volume for the customer segment satisfies one or more call volume thresholds. The voice quality tester 214 measures voice quality in accordance with the established rules. In this manner, voice quality is tested at times and in portions of the network where the voice quality is most likely to be degraded. This provides an accurate measure of voice quality on a per customer segment basis, as compared to arbitrarily testing voice quality or testing voice quality in the network as a whole. The sample measurements of voice quality for each of the customer segments may be displayed to a network analyst.

The voice quality tester 214 may comprise any type of voice quality monitoring/testing platform known in the art. Exemplary platforms include International Telecommunications Union (ITU) standard P.862 (referred to as Perceptual Evaluation of Speech Quality (PESQ), Perceptual Analysis Measurement System (PAMS), Perceptual Speech Quality Measure (PSQM) systems and the like. The voice quality tester 214 voice quality measurement scores. In one embodiment, the voice quality measurement scores are based on the ITU standard P.800.1 (referred to as mean opinion score (MOS) scale), which are representative of customers' perceptions of quality. Briefly stated, the voice quality tester 214 is configured to measure voice quality by placing a call using an input test signal and comparing the output of the call with the original input test signal. Such voice quality testing is well known in the art.

For purposes of clarity by example, only a single application server is shown. It is to be understood that multiple application servers may be employed, each of which may implement a voice quality tester, a call volume analyzer, or both such modules. Also, while only three portions 202 are shown, it is to be understood that the network 110 may include any number of portions corresponding to different geographical regions.

Figure 3:
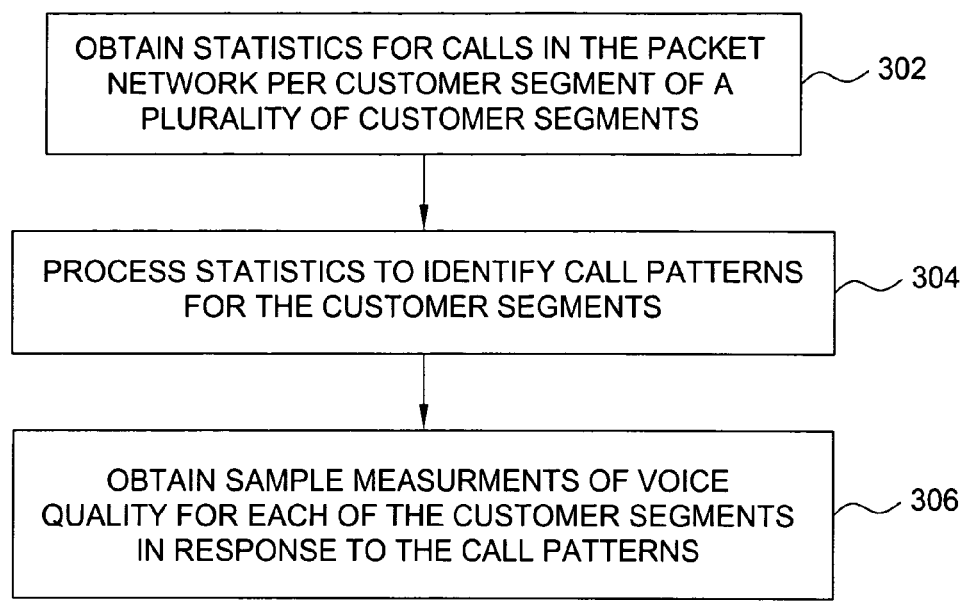
FIG. 3 is a flow diagram depicting an exemplary embodiment of a method for measuring voice quality in a packet network in accordance with one or more aspects of the invention.

FIG. 3 is a flow diagram depicting an exemplary embodiment of a method 300 for measuring voice quality in a packet network in accordance with one or more aspects of the invention. The method 300 begins at step 302, where statistics for calls in the packet network are obtained per customer segment of a plurality of customer segments over a period of time. At step 304, the statistics are processed to identify call patterns for the customer segments. For example, call volumes may be measured in the packet network for the customer segments over time. Geographical distributions of calls may be identified for the customer segments over time. The call patterns for the customer segments correlate call volume, time (e.g., time of day, day of week, etc.), and geographical call distribution.

At step 306, sample measurements of voice quality are obtained for each of the customer segments in response to the call patterns. For example, for each of the customer segments, voice quality is sampled within a portion or portions of the network corresponding to the geographical distribution identified for the customer segment, at times when call volume for the customer segment satisfies one or more threshold call volumes. The method 300 may be repeated for multiple time periods.

Figure 4:
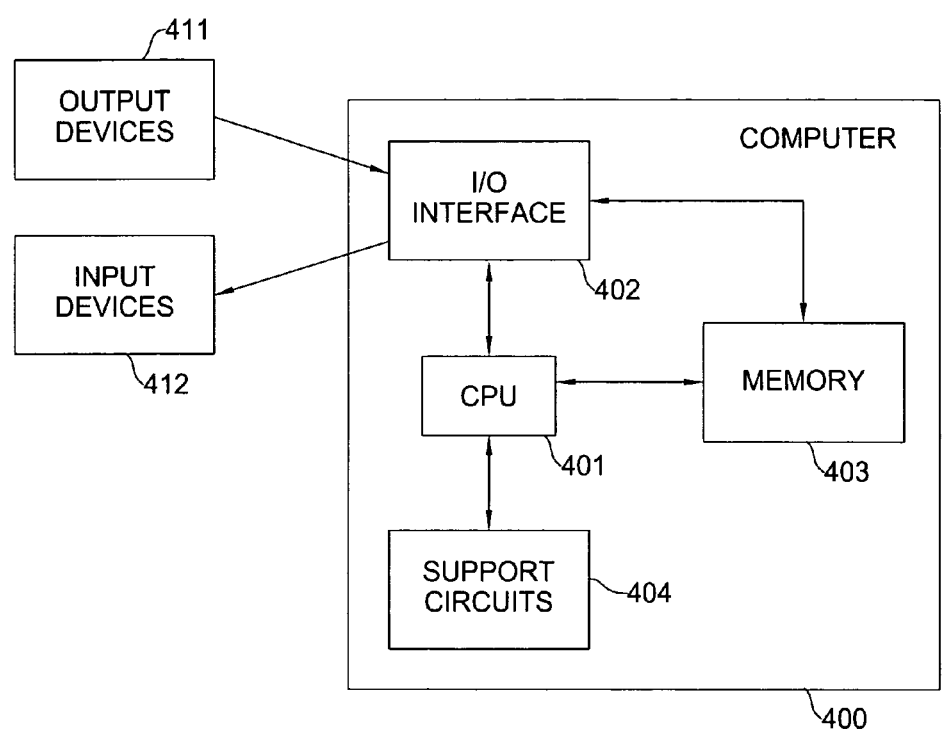
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 may be used to implement the application server 210 and the method 300 of FIG. 3. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, and the like.

The memory 403 may store all or portions of one or more programs and/or data to implement the processes and methods described herein. Notably, the memory 403 may store program code to be executed by the CPU 401 for performing the method 300 of FIG. 3. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of measuring a voice quality in a packet network, comprising:

obtaining, by a processor, statistics for calls in the packet network per a customer segment of a plurality of customer segments over a period of time, wherein the plurality of customer segments includes a consumer segment, a wholesaler segment, and an enterprise segment, wherein the obtaining statistics comprises:

measuring call volumes in the packet network for the plurality of customer segments over the period of time; and identifying geographical distributions of the calls for each of the plurality of customer segments over the period of time, wherein the identifying geographical distributions comprises determining a distribution of the calls over a plurality of different network portions;

processing, by the processor, the statistics to identify call patterns for the plurality of customer segments, wherein the call patterns are based on the call volumes over the period of time and the geographical distributions; and obtaining, by the processor, sample measurements of voice quality for each of the plurality of customer segments in response to the call patterns, wherein the obtaining sample measurements comprises:

sampling, for each customer segment of the plurality of customer segments, the voice quality within a portion of the packet network based on a geographical distribution of the geographical distributions identified for the customer segment, and at times when a call volume of the call volumes for the customer segment satisfies a threshold call volume.

2. The method of claim 1, wherein the packet network comprises an internet protocol network.

3. An apparatus for measuring a voice quality in a packet network, comprising:

an application server comprising a processor, and a computer-readable medium storing a plurality of instructions which, when executed by the processor, cause the processor to perform operations, the operations comprising:

obtaining statistics for calls in the packet network per a customer segment of a plurality of customer segments over a period of time, wherein the plurality of customer segments includes a consumer segment, a wholesaler segment, and an enterprise segment, wherein the application server obtains the statistics by measuring call volumes in the packet network for the plurality of customer segments over the period of time and identifying geographical distributions of the calls for each of the plurality of customer segments over the period of time, wherein the identifying geographical distributions comprises determining a distribution of the calls over a plurality of different network portions;

processing the statistics to identify call patterns for the plurality of customer segments, wherein the call patterns are based on the call volumes over the period of time and the geographical distributions; and obtaining sample measurements of voice quality for each of the plurality of customer segments in response to the call patterns, wherein the obtaining sample measurements comprises:

sampling, for each customer segment of the plurality of customer segments, the voice quality within a portion of the packet network based on a geographical distribution of the geographical distributions identified for the customer segment, and at times when a call volume of the call volumes for the customer segment satisfies a threshold call volume.

4. The apparatus of claim 3, wherein the packet network comprises an internet protocol network.

5. A non-transitory computer readable medium storing a plurality of instructions that, when executed by a processor, cause the processor to perform operations of measuring a voice quality in a packet network, the operations comprising:

obtaining statistics for calls in the packet network per a customer segment of a plurality of customer segments over a period of time, wherein the plurality of customer segments includes a consumer segment, a wholesaler segment, and an enterprise segment, wherein the obtaining statistics comprises:

measuring call volumes in the packet network for the plurality of customer segments over the period of time; and identifying geographical distributions of the calls for each of the plurality of customer segments over the period of time, wherein the identifying geographical distributions comprises determining a distribution of the calls over a plurality of different network portions;

processing the statistics to identify call patterns for the plurality of customer segments, wherein the call patterns are based on the call volumes over the period of time and the geographical distributions; and obtaining sample measurements of voice quality for each of the plurality of customer segments in response to the call patterns, wherein the obtaining sample measurements comprises:

sampling, for each customer segment of the plurality of customer segments, the voice quality within a portion of the packet network based on a geographical distribution of the geographical distributions identified for the customer segment, and at times when a call volume of the call volumes for the customer segment satisfies a threshold call volume.

6. The non-transitory computer readable medium of claim 5, wherein the packet network comprises an internet protocol network.

* * * * *